Aug. 21, 1951 — C. M. WAKEMAN — 2,565,285
DEVICE FOR STABILIZING TRAILERS
Filed April 12, 1950 — 2 Sheets-Sheet 1
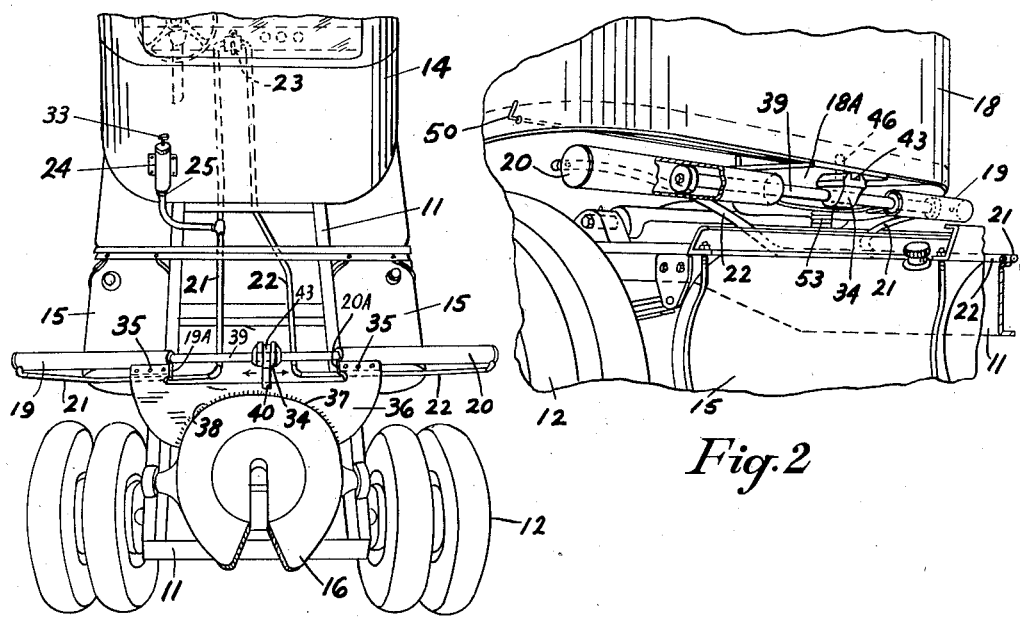
Fig. 2
Fig. 1
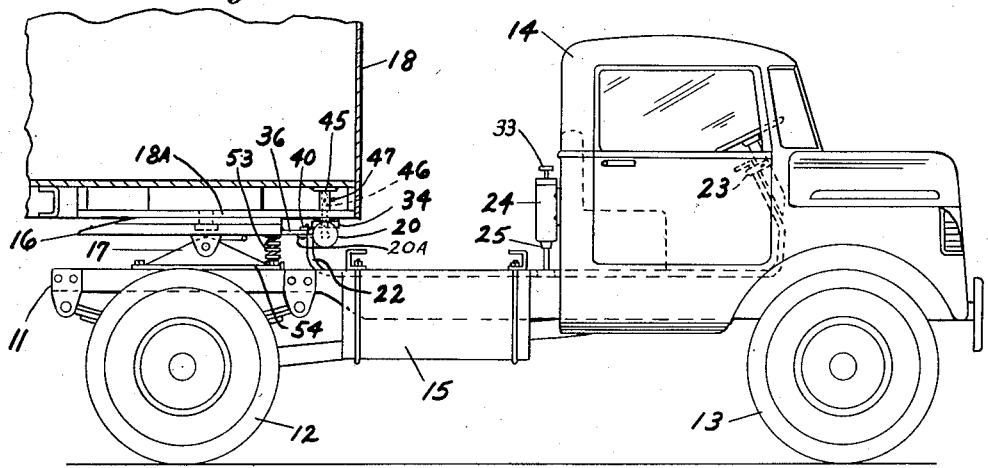
Fig. 3
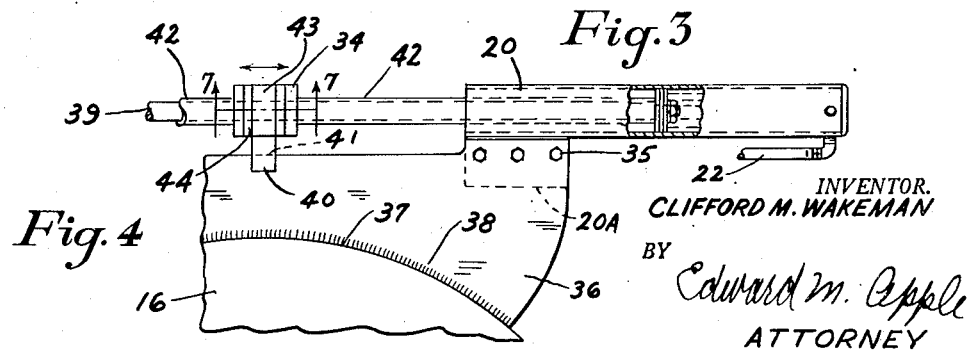
Fig. 4
INVENTOR.
CLIFFORD M. WAKEMAN
BY Edward M. Apple
ATTORNEY Aug. 21, 1951     C. M. WAKEMAN     2,565,285
DEVICE FOR STABILIZING TRAILERS Filed April 12, 1950     2 Sheets-Sheet 2

INVENTOR.
CLIFFORD M. WAKEMAN

BY Edward M. Apple
ATTORNEY

Patented Aug. 21, 1951

2,565,285

UNITED STATES PATENT OFFICE 2,565,285

DEVICE FOR STABILIZING TRAILERS

Clifford M. Wakeman, Flint, Mich.

Application April 12, 1950, Serial No. 155,388

7 Claims. (Cl. 280—33.05)

1

This invention relates to devices for stabilizing trailers such as disclosed in United States Letters Patent No. 2,470,383, issued to me May 17, 1949.

An object of the invention is to generally improve such stabilizing devices and to provide an integrated working unit which is readily mounted to the "fifth wheel" of any tractor, regardless of size or make, and without interfering with any of the tractor's electrical, vacuum or pneumatic systems.

Another object of the invention is to provide a stabilizing device of the character indicated, which will effectively control a towed vehicle, such as a trailer, through a turning arc which is more than twice as great as any such arc heretofore operated in.

Another object of the invention is to provide thrust control elements on both tractor and trailer, which are constructed and arranged to provide full side pressure throughout the full length of the controlled turning arc.

Another object of the invention is to provide thrust control elements for the tractor and trailer, which are constructed and arranged to obviate any tendency of the trailer to exert forward pressure on the control block and the shafts connecting the pistons, while turning.

Another object of the invention is the provision of a stabilizing device, which is constructed with a retractable thrust member which can readily be locked in and out of operating position.

Another object of the invention is to provide an integrated working unit for mounting on the "fifth wheel" of a tractor, which is provided with means to counter-balance the weight of the unit on the tractor.

Another object of the invention is to provide an improved and readily accessible fluid reserve tank for stabilizing devices of this character.

Other objects of the invention are: To prevent jack-knifing at any time; to hold the towed and towing units in alignment on down grades or upon the sudden application of brakes; to permit the instantaneous locking of a trailer or train into a single unit and to unlock them as quickly; and to eliminate the whipping of trailers, whether two or four wheelers.

The foregoing and other objects and advantages of the invention will become more apparent as the description proceeds, reference being made from time to time to the accompanying drawings forming part of the within disclosure, in which drawings:

Fig. 1 is a rear view in perspective, with parts broken away, of a tractor equipped with a device embodying the invention.

2

Fig. 2 is a fragmentary perspective view of the front end of a trailer and the rear end of a tractor carrying the device embodying the invention.

Fig. 3 is a side elevational view of the tractor and showing in section the front portion of the trailer with the stabilizing device embodying the invention mounted thereon.

Fig. 4 is an enlarged fragmentary plan view, partly in section, illustrating certain parts of the device embodying the invention.

Fig. 5 is a diagrammatic view, showing the relation of the "fifth wheel" of the tractor and the thrust control elements, and the arc through which the device operated as disclosed in my previous patent hereinabove referred to.

Figure 5:
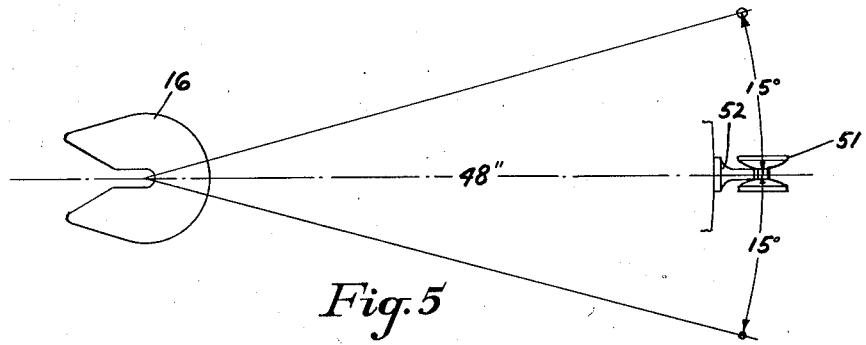

Referring now more particularly to the drawings, it will be understood that in the embodiment herein disclosed, the reference character 11 indicates the frame of a tractor, having driving wheels 12, front wheels 13, driver's cab 14, gas tanks 15, and a conventional "fifth wheel" 16, which is mounted, as at 17, to the tractor frame 11 as in conventional practice. The reference character 18 indicates the front end of the body of the trailer which is pivotally supported on the "fifth wheel" 16 of the tractor, also as in conventional practice.

The foregoing elements comprise a conventional tractor and trailer assembly and form no part of the invention, except as combined with the elements hereinafter described. It is the purpose of the device, which I will now describe, to control the radial movement of the front end of the trailer 18, whereby to accomplish the purposes set forth in the objects hereinabove indicated.

As disclosed in my previous patent hereinabove referred to, I provide a pair of hydraulic cylinders 19 and 20, which are connected by fluid lines 21 and 22 to the control valve 23 positioned in the cab 14, within easy reach of the driver. The valve 23 is intended to control the flow of the fluid in the lines 21 and 22, to and from the cylinders 19 and 20, as described in my previous patent. The fluid reservoir 24 is connected to the line 21 by means of a line 25, and a one-way valve 26 is positioned at the juncture of the lines 21 and 25 and serves to permit fluid from the reservoir 24 to enter the line 21, in the event that the fluid level in the line 21 becomes lowered for any reason.

Figure 9:
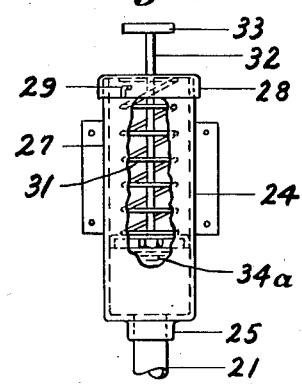
Fig. 9 is an enlarged elevational view, with parts broken away, showing the improved reserve tank used in the hydraulic system of the device.

I prefer to position the fluid reservoir 24 on the outside of the cab 14, so that it is readily accessible for refilling and the like. The fluid reservoir (Fig. 9) consists of a cylindrical member 27 having a top closure member 28, which is locked in position by means of a bayonet lock 29. A plunger 30, which is backed by a spring 31 is mounted at the end of a rod 32 which slidably extends through the top 28. The rod 32 has a hand grip 33 thereon, so that the plunger, spring, and top assembly may be readily lifted off of the cylinder 27 when it is desired to refill the reservoir. A pre-determined pressure is maintained on the fluid 34A in the reservoir by means of the spring 31.

The cylinders 19 and 20 have mounting brackets 19A and 20A welded to them, which brackets are secured by means of bolts 35, to the mounting plate 36, which has a cutout portion 37 adapted to engage the leading arcuate edge of the "fifth wheel" 16 to which it is welded, as at 38.

The pistons of the cylinders 19 and 20 are carried at opposite ends of the shaft or rod 39, and at the center of the rod 39 is secured a control block 34, the latter having a tongue 40 (Fig. 3) which is slotted, as at 41, to engage the leading edge of the mounting plate 36. The tongue 40 serves as a guide and prevents the rod 39 and the control block 34 from rotating. Tubular members 42 are preferably carried on the rod 39 between the respective pistons and the control block 34 and assist in maintaining the control block 34 in proper position on the rod 39. It will be noted that the control block 34 (Fig. 7) has a comparatively deep transverse channel 43 machined in it, the said channel having vertical walls 44. The walls 44 are comparatively thick and are adapted to absorb the side thrust of the trailer as hereinafter described.

Figure 8:
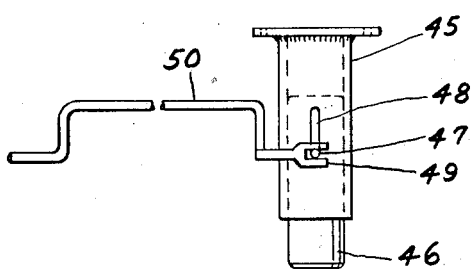
Fig. 8 is an enlarged fragmentary detail, in elevation, showing the retractable thrust pin and locking means for the same.

Slidably mounted in a housing 45 (Figs. 3 and 8) which is secured to the underside of the trailer 18 is a retractable pin 46 (Figs. 2, 3, and 8), the lower end of which extends through the trailer bearing plate 18A and is arranged to ride in the channel 43 of the control block 34, whereby the radial thrust of the trailer 18 is imparted to the control block 34. The pin 46 is provided with a smaller cross pin 47, which is adapted to travel in a longitudinal slot 48 formed in the pin housing 45. A bifurcated arm 49 is adapted to engage the cross pin 47, whereby the pin 46 may be moved longitudinally in the housing 45. A crank 50 is mounted in suitable brackets on the underside of the trailer 18 and extends beyond the side wall of the trailer as shown in Fig. 2, whereby upon rotation of the crank, the pin 46 may be locked in an upward or retracted position or moved to the lower position where it engages the walls 44 of the channel 43 of the control block 34. The contacting of the pin 46 with the vertical side walls 44 of the control block 34 gives me complete control over the side thrust of the trailer throughout the entire length of the control arc, and in operation this construction eliminates entirely the tendency of the trailer to impart a forward pressure to the piston rod which often resulted when I employed the convex disc-like members 51 (Fig. 5) as disclosed in my original patent.

Figures 6, 7:
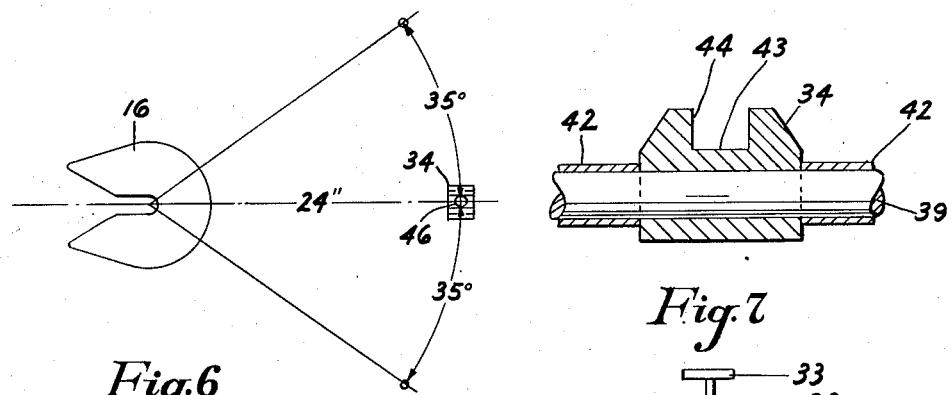
Fig. 6 is a diagrammatic view, showing the relation of the "fifth wheel" of the tractor and the new thrust control elements, and the arc through which the device now controls the trailer as taught in the instant disclosure.
Fig. 7 is an enlarged fragmentary detail, in section, taken substantially on the line 7—7 of Fig. 4.

With the new structure comprising the control block 34 and the retractable pin 46 and their associated parts, I have been able to reduce the distance between the center of the "fifth wheel" 16 and the center of the control block 34, as is clearly shown by a comparison of the illustrations shown in Fig. 5 and Fig. 6. By the same token, I have been able to more than double the length of the arc through which the trailer 18 is now controlled.

It will be noted that in Fig. 5, which illustrates the control arc of the structure disclosed in my previous patent, that it extends approximately 15 degrees on either side of the center of the thrust bracket 52, and it will be noted that in Fig. 6, the control arc of my improved structure extends approximately 35 degrees on either side of the center of the control block 34 when it is positioned in dead center.

It will also be noted that in the old structure as shown in Fig. 5, the distance between the center of the "fifth wheel" 16 and the center of the thrust members 51 is approximately 48 inches; whereas, in my new structure as shown in Fig. 6, the distance between the center of the "fifth wheel" 16 and the control block 34 is only 24 inches. This is one of the important features of the invention as it enables me to greatly improve the stabilizing effect of the device with greatly decreased wear and tear on the moving parts. The entire weight of the assembly as secured to the front end of the "fifth wheel" 16 is counterbalanced by means of a compression spring 53 (Figs. 2 and 3) which is interposed between the underside of the "fifth wheel" 16 and the cross plate 54 which supports the "fifth wheel" 16.

Having described my invention what I claim and desire to secure by Letters Patent is:

1. In a device of the character described, including a trailer and a tractor having a "fifth wheel," the combination of a mounting plate secured to the front edge of said "fifth wheel," hydraulic cylinders supported by said mounting plate, a piston in each of said cylinders, a rod connecting said pistons, a control block secured to said rod between said pistons, said control block having a transverse channel therein, and a retractable pin carried by said trailer and arranged to travel in said channel.

2. The combination defined in claim 1, including means controllable from the exterior of said trailer for locking said retractable pin in and out of engagement with said channel in said control block.

3. The combination defined in claim 1, in which said channel is defined by a pair of comparatively thick vertical side walls.

4. The structure defined in claim 1, including a compression spring positioned between said "fifth wheel" and the frame of said tractor, and arranged to counter-balance the weight of said "fifth wheel," said mounting plate, said cylinders and said control block.

5. The combination defined in claim 1, in which said cylinders are connected to a common hydraulic line, there being a valve positioned in said line between said cylinders for controlling the flow of fluid in said line.

6. The combination defined in claim 1, in which said cylinders are connected to a common hydraulic line, there being a valve in said line for controlling the flow of fluid in said line, and a fluid reservoir for maintaining a certain fluid level in said line, said fluid reservoir having a spring actuated plunger for maintaining a predetermined fluid pressure in said line.

7. In a device of the character described, including a tractor having a "fifth wheel" and a driver's cab, and a trailer having one end thereof mounted on the "fifth wheel" of said tractor, the combination of a mounting plate secured to the "fifth wheel" of said tractor, a pair of hydraulic cylinders secured to said mounting plate, pistons in said cylinders, a rod connecting said pistons, a control block mounted on said rod and having a deep channel defined by a pair of heavy walls, a rectractable pin mounted at the underside of said trailer and arranged to impart side thrust to the walls of said channel, a hydraulic line connecting the outer ends of said cylinders, and a fluid reservoir positioned near a door in said driver's cab and in communication with said hydraulic line.

CLIFFORD M. WAKEMAN.

REFERENCES CITED

The following references are of record in the file of this patent:

UNITED STATES PATENTS

| Number | Name | Date |
| --- | --- | --- |
| 2,468,705 | Price | Apr. 26, 1949 |
| 2,470,383 | Wakeman | May 17, 1949 |